(12) United States Patent
Norton, Jr. et al.

(10) Patent No.: US 12,530,054 B2
(45) Date of Patent: Jan. 20, 2026

(54) COMPUTING DEVICE

(71) Applicant: Lenovo (Singapore) Pte. Ltd., Singapore (SG)

(72) Inventors: Robert James Norton, Jr., Morrisville, NC (US); Robert J Kapinos, Morrisville, NC (US); Russell S VanBlon, Morrisville, NC (US); Scott Wentao Li, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 300 days.

(21) Appl. No.: 18/206,957

(22) Filed: Jun. 7, 2023

(65) Prior Publication Data
US 2024/0411347 A1 Dec. 12, 2024

(51) Int. Cl.
*G06F 1/16* (2006.01)
(52) U.S. Cl.
CPC .................................. *G06F 1/1656* (2013.01)
(58) Field of Classification Search
CPC .... G06F 1/1607; G06F 1/1613; G06F 1/1629; G06F 1/1656; H04M 1/185
See application file for complete search history.

(56) References Cited

U.S. PATENT DOCUMENTS

| | | | | |
|---|---|---|---|---|
| 7,059,182 B1* | 6/2006 | Ragner | ................. | H04M 1/185 73/200 |
| 8,509,865 B1* | 8/2013 | LaColla | ................. | H04M 1/04 455/575.8 |
| 10,585,450 B1* | 3/2020 | Giazzon | ................ | G06F 1/1616 |
| 11,487,320 B1* | 11/2022 | Giazzon | ................ | G06F 1/1613 |
| 2014/0347814 A1* | 11/2014 | Zaloom | ...................... | G06F 1/16 248/688 |
| 2015/0108030 A1* | 4/2015 | Yin | ........................ | A45C 11/00 206/521 |
| 2015/0331456 A1* | 11/2015 | Moon | ................... | G06F 1/1656 361/679.55 |
| 2017/0355507 A1* | 12/2017 | Rivellini | ................... | H01F 7/17 |
| 2021/0045510 A1* | 2/2021 | Okada | .................... | G06F 1/1632 |
| 2022/0239771 A1* | 7/2022 | Ando | .................... | H04M 1/185 |
| 2025/0174878 A1* | 5/2025 | Hill | ..................... | H04M 1/0283 |

OTHER PUBLICATIONS

Russell, A.R., A compression line for soils with evolving particle and pore size distributions due to particle crushing, Geotechnique Letters 1, 5-9, 2011 (5 pages).
Black et al., Corning Gorilla Glass, Controlled Edge Damage by Dynamic Impact, Nov. 2010 (5 pages).
Kuwik et al., Energy dissipation due to breakage during confined compaction of granular materials, EPJ Web of Conferences 249, 07006, 2021 (4 pages).

(Continued)

*Primary Examiner* — Anthony Q Edwards
(74) *Attorney, Agent, or Firm* — Brian J. Pangrle

(57) ABSTRACT

A computing device can include a processor, memory accessible to the processor; a display operatively coupled to the processor, a housing that includes four corners formed by opposing side edges that extend between opposing front and back edges; and breakable bumpers, where each of the breakable bumpers is coupled to the housing at one or more of the four corners.

20 Claims, 14 Drawing Sheets

(56) References Cited

OTHER PUBLICATIONS

Luo et al., Legolization: Optimizing LEGO Designs, ACM Transactions on Graphics, vol. 34, Issue 6, Article No. 222, pp. 1-12, 2015 (12 pages).
Wang et al., Using LEGO Bricks to Conduct Engineering Experiments, Session 2756, Proceedings of the 2004 American Society for Engineering Education Annual Conference and Exposition (18 pages).

* cited by examiner

COMPUTING DEVICE

TECHNICAL FIELD

Subject matter disclosed herein generally relates to technology for computing systems or other systems.

BACKGROUND

A computing system can be a mobile device such as, for example, a mobile phone, a tablet, a laptop (e.g., clamshell), etc., which may be at risk of damage due to a fall and impact with a hard surface.

SUMMARY

A computing device can include a processor; memory accessible to the processor; a display operatively coupled to the processor; a housing that includes four corners formed by opposing side edges that extend between opposing front and back edges; and breakable bumpers, where each of the breakable bumpers is coupled to the housing at one or more of the four corners. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
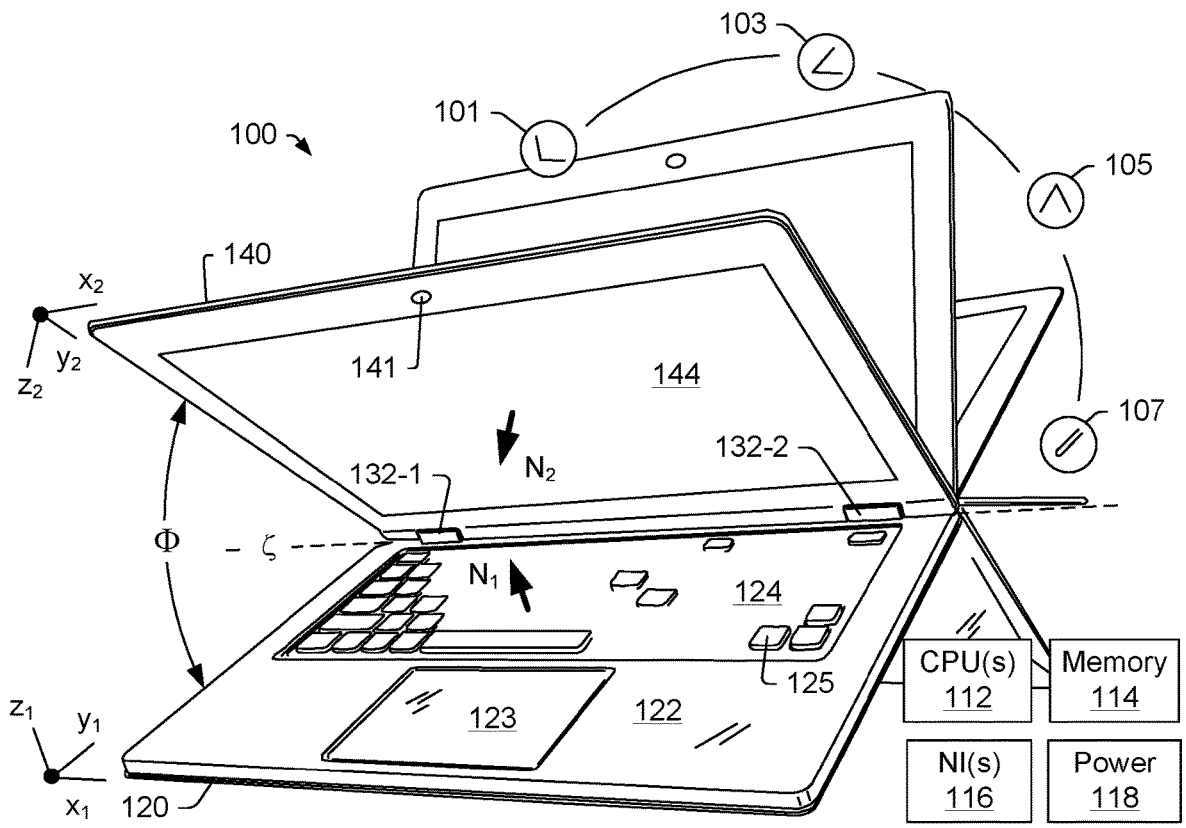
FIG. 1 is a diagram of an example of a computing device.
Figure 1:
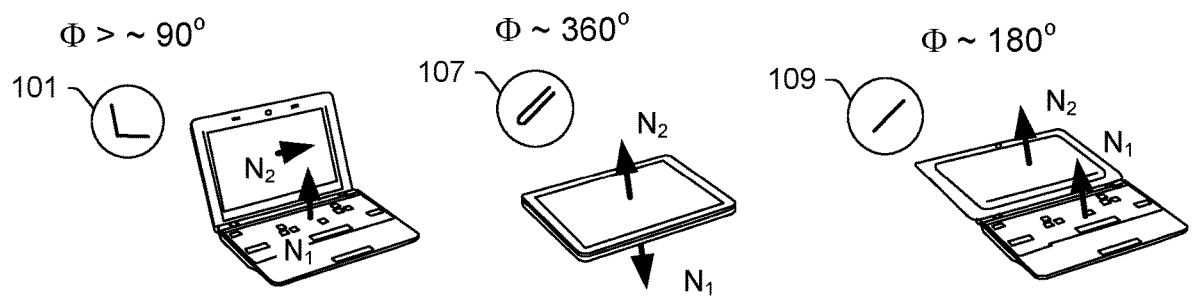

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces (NIs) 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle ¢ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the user's hand or hands. A user may perceive the springiness of the keys 125 as being somewhat undesirable. For example, springy keys may interfere with a user's ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
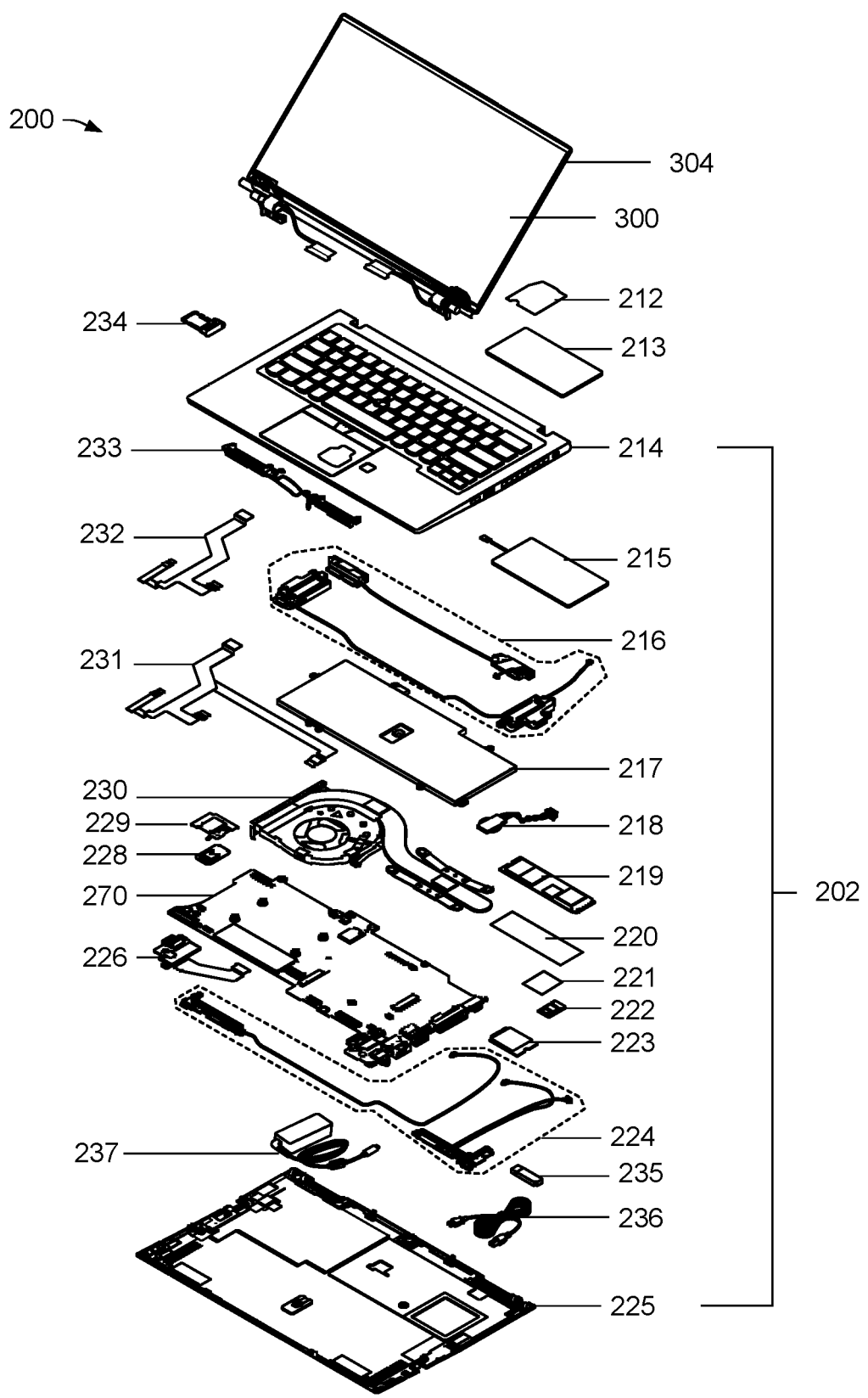
FIG. 2 is a diagram of an example of a computing device or computing system.

FIG. 2 shows an exploded perspective view of a computing device 200 as including various components, which can include, for example, a display assembly 300, a housing 304 (e.g., a display housing), insulation trackpad tape 212, a trackpad 213 or 215, a keyboard bezel assembly with a keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237. The computing device 200 may be referred to as a computing system that can include various components, circuitry, etc.

In the example of FIG. 2, various components can form a housing 202, which may be referred to as a base housing and/or a keyboard housing, where the housing 202 may be coupled to the housing 304 via one or more hinge assemblies, etc. For example, the computing device 200 can include a first housing 202 coupled to a second housing 304 via one or more hinge assemblies (see, e.g., one or more hinge assemblies 326 of FIG. 3, etc.).

Figure 3:
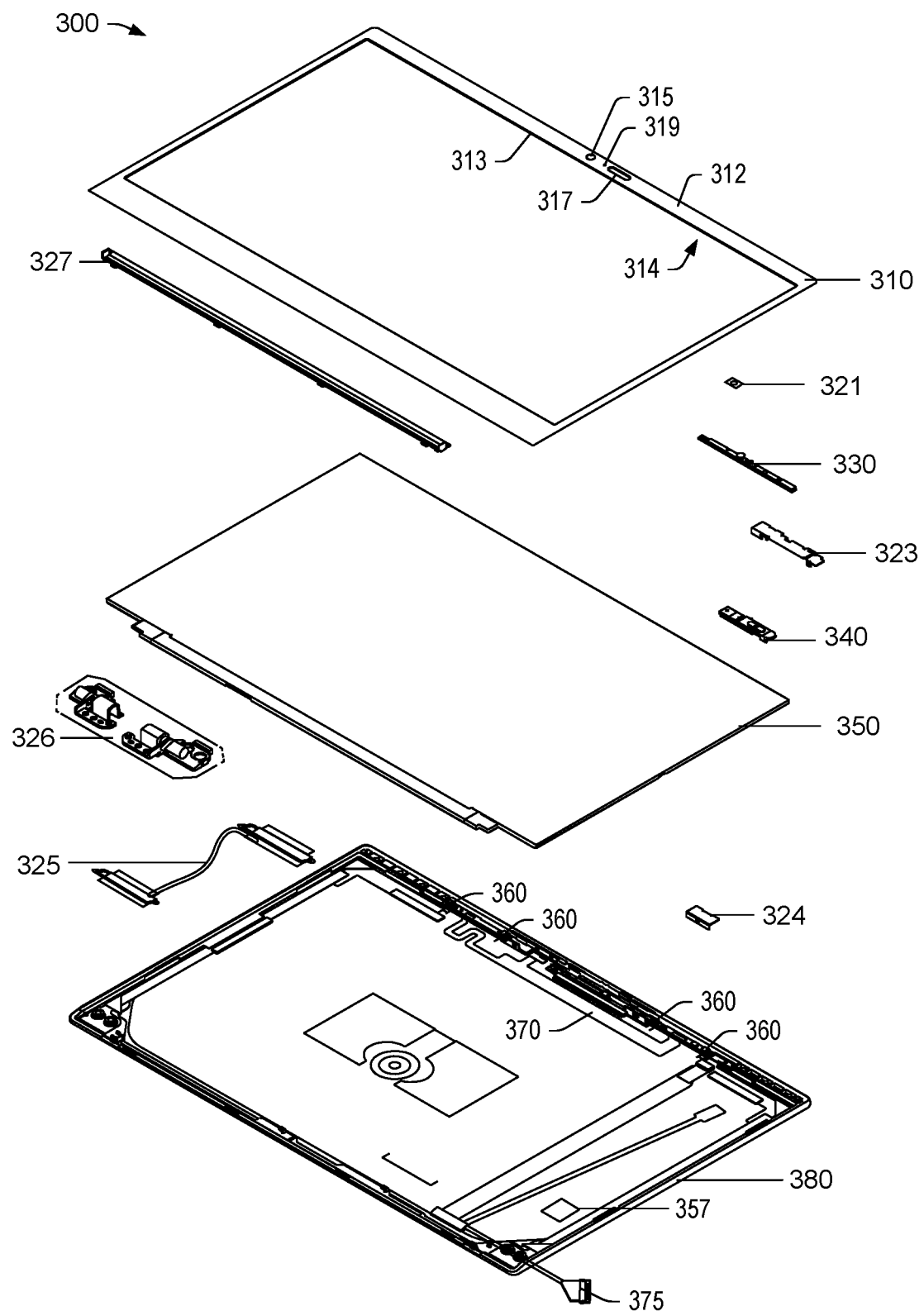
FIG. 3 is a diagram of an example of a display assembly of the computing device or computing system of FIG. 2.

FIG. 3 shows an exploded perspective view of the display assembly 300 of FIG. 2 as including various components, which can include, for example, a bezel 310, a foam component for an IR LED camera 321, a camera assembly 330, a stopper 323, a shutter 340, a display panel 350, an orientation sensor 357 (e.g., an accelerometer, gyroscope, etc.), a support plate 324, one or more microphones 360, wiring 370, one or more wiring connectors 375, a back side (rear) cover assembly 380, a display cable 325, one or more hinge assemblies 326, and a display bezel frame component 327. As shown, the display assembly 300 can be assembled to form the display housing 304, for example, by joining the bezel 310 (e.g., as a front side cover) and the back side cover assembly 380.

In the example of FIG. 2 and FIG. 3, the computing device 200 can include various media capture components. For example, a camera can be a media capture component, a microphone can be a media capture component, etc. A media capture component may be an audio media capture component, a video media capture component, a still image media capture component, etc.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera assembly 330 couples to the back side cover assembly 380 where the wiring 370 operatively couples to the camera assembly 330 and to the one or more microphones 360. The display assembly 300 can be operatively coupled to other circuitry of the computing device 200, for example, via the one or more wiring connectors 375.

As an example, a display housing can be referred to as being bezel-less where the size of a bezel or a frame is relatively small such that a display panel can extend to an edge or near an edge. For example, consider a smartphone that may have an edge of a housing or a frame that forms a thin bezel (e.g., less than 5 mm) about a display surface (e.g., a display glass, etc.).

As an example, inclusion of a bezel along one or more portions of a perimeter of a display housing, where such one or more portions have a thickness greater than a few millimeters, may help to provide protection for a display panel, which may include a display glass (e.g., cover glass).

A computing device can include various components that can be damaged upon application of force, which may be an impact force. For example, consider a 1 kg computing device that is dropped from a distance of 1 m. In such an example, the gravitational acceleration (g) is 9.81 m/s$^2$ and the initial vertical velocity can be assumed to be 0 m/s, which results in a time of fall of 0.452 seconds with a velocity at impact of 4.43 m/s. The kinetic energy of the computing device at the impact velocity can be computed using the equation $E=0.5 \times m \times v^2$, which is 9.81 joules (Nm) (e.g., 1 G-force).

An object upon impact may deform or may not deform. An object that deforms upon impact can result in slowing down of the object over a distance (e.g., a slow-down distance); whereas, an object that does not deform upon impact does not slow down over a distance. The work made by the impact force slowing down a moving object over a distance by deforming (e.g., a crumple zone) can be expressed as: $W=F_{avg}s$, where $F_{avg}$ is the average impact force during deformation (e.g., in newtons) and s is the deformation distance (e.g., in meters). For cars, when a crumple zone deforms in a car crash, the average impact force is designed to be as constant as possible. In a car crash, dynamic energy is converted to work, where $F_{avg} s=0.5 \times m \times v^2$ and the average impact force can be calculated as: $F_{avg}=0.5 \times m \times v^2/s$. In such an example, the deformation slow-down distance can be calculated as: $s=0.5 \times m \times v^2/F_{avg}$. The deformation slow-down distance can be a factor in limiting forces acting on passengers in a car crash.

As to a person with a mass of 90 kg, falling a distance of 1.2 m and an impact distance of 2 cm (e.g., slow-down distance), energy can be computed as $E=(90\ kg) \times (9.81\ m/s^2) \times (1.2\ m)=1059$ J while $F_{avg}=(1059\ J)/(0.02\ m)=53$ kN. As indicated a longer slow-down distance can reduce $F_{avg}$. Now consider the aforementioned example for a computing device with a mass of 1 kg and falling a distance of 1 m, now with an assumed impact distance of 0.5 cm (e.g., 0.005 m). Such a computing device can, as before, have $E=(1\ kg) \times (9.81\ m/s^2) \times (1\ m)=9.81$ J while, given the impact distances, $F_{avg}=(9.81\ J)/(0.005\ m)=1.962$ kN (e.g., 1,962 N or approximately 440 lbf). In contrast, if the impact distance is 0.1 cm, then $F_{avg}=9.81$ kN (e.g., 9,810 N or approximately 2,205 lbf).

As an example, a bumper for a computing device can provide for a reduction in $F_{avg}$ experienced by the computing device. Such a bumper can be a breakable bumper that is plastically deformable and, in various examples, optionally, reusable. As to plastic deformation, it can be defined to include deformation whereby a breakable bumper breaks into pieces, which may be, in various examples, a controlled type of breakage. For example, a controlled type of breakage may occur for bumper pieces that are fit together, for example, via one or more interference fits.

As explained, in various instances, plastic deformation can be considered a type of breakage in that, once plastically deformed, the plastically deformed bumper may be ineffective in performing its intended function; whereas, an elastically deformable bumper may regain its initial form and be able to effectively perform its intended function (e.g., a number of times, a number of cycles, etc.).

As mentioned, a breakage mechanism for a bumper that can be utilized to absorb energy upon impact can include fracturing where the bumper can be broken into multiple pieces. For example, consider a bumper that cleaves into multiple pieces in a relatively predefined manner, which may be along planes, interfaces, etc. For example, consider certain types of crystalline material that can break by cleaving along defined planes, axes, etc. As another example, consider a bumper that includes grooves, slots, voids, etc., which may dictate how the object breaks upon impact. As mentioned, a bumper may be an assembly of pieces that are assembled using one or more interference fits (e.g., press fits). In such an example, the bumper may break apart into pieces responsive to impact. In such an example, one or more of the pieces may scatter (e.g., move away from a housing).

As an example, particles may be utilized by a bumper where upon impact at least some of the particles break. For example, consider particles that can be confined to a cavity of a bumper of a device that can be dropped from a height. In such an example, depending on particle characteristics, there may be no relation between largest particle and drop height, suggesting that the largest particle does not break. Such a finding may seem counter intuitive because larger particles tend to have larger and more internal defects than smaller particles, making them easier to fracture. However, during initial stages of compaction, the large granules can start to fracture, creating smaller granules. In such an example, the smaller particles can fill in voids around larger particles, increasing the packing efficiency. The smaller particles can also act to transform a small number of high intensity contact forces from pre-compaction to many lower intensity contact forces, thus creating a "cushion" effect. In such an example, the cushion can cause larger particles to be in a hydrostatic state of compression, causing internal defects to be in compression. Under compression loading, microcracks will not necessarily propagate, mitigating the effects of larger microcracks in larger particles (see, e.g., Kuwik et al., Energy dissipation due to breakage during confined compaction of granular materials, EPJ Web of Conferences 249, 07006 (2021), Powders and Grains 2021, which is incorporated by reference herein).

As explained, during loading, such as by an impact force, particles can be compacted such that their yield point (yield strength) is reached, resulting in fracturing. While fracturing can dissipate energy, friction, thermal effects and/or one or more other mechanisms may dissipate energy. For example, consider elastic energy, plastic dissipation energy, breakage energy and redistribution energy.

As to yield strength, or yield stress, of a material, it is the stress corresponding to the yield point at which the material begins to deform plastically. The yield strength may be utilized to determine the maximum allowable load in a mechanical component, as the yield strength represents an upper limit to forces that can be applied without producing permanent deformation.

As an example, an approach to dissipation of impact force can involve breaking a bumper into pieces where the pieces can be mobile (e.g., consider scattering). For example, consider momentum conservation in explosions where an explosive charge is placed in a void of an object that is stationary. Before discharge, the total system momentum is zero; however, upon explosion, the object will break into a variety of pieces (e.g., fragments, etc.). In such an example, the vector sum of the momenta of the individual fragments is zero such that the total system momentum is the same before and after the explosion.

As an example, consider a device as an assembly with a main object and a number of secondary objects, which may be or include bumpers, where, upon impact, the number of secondary objects can scatter away from the main object. In such an example, the number of secondary objects can reduce the momentum of the main object. Hence, there can be a protective effect provided by the presence of the number of secondary objects.

As an example, a computing device may include one or more features that can provide for protection of the computing device upon impact due to a fall. In such an example, the one or more features may act in one or more manners, which may be according to one or more different mechanisms that can help to reduce the effect of the impact on the computing device.

As explained, various mechanisms can be plastic or primarily plastic. For example, consider a computing device with bumpers that can deform plastically and breakaway responsive to an impact force. In such an example, plastic deformation may involve separation of an assembly of bumper pieces, which, depending on condition, may be collected and reassembled for reuse.

Various types of bricks exist that can be interference fit to make an assembly. For example, consider LEGO bricks where a single brick may have a yield strength sufficient to support a force of over 4,000 N. As to separation force to pull apart two LEGO bricks that have been interference fit together to form an assembly, such a force may be approximately 5 N (e.g., approximately 1 lbf) where 5N may be sufficiently low to allow for children to play with the bricks by assembling and disassembling them.

As an example, a bumper may be a breakable bumper that can at least in part breakaway from a computing device responsive to an impact force. In such an example, the bumper may be formed of pieces where, for example, the pieces are interference fit to form the bumper. As an example, a bumper can include material such as, for example, one or more of a fluid, a gel and particles. In such an example, a fluid may be one or more of a gas and a liquid. As an example, a bumper can include a cavity that can contain material where, for example, the material may be expressed from the cavity responsive to an impact force. In such an example, the material, as part of the bumper, can be a breakaway part of the bumper.

As mentioned, a bumper can be plastically deformable such that it plastically deforms responsive to an impact force. For example, consider a bumper formed of cells such as honeycomb cells (e.g., polygonal cells, etc.). In such an example, the bumper can plastically deform responsive to an impact force such that the cells permanently deform. As an example, cells may be at least partially filled with a material, which may, for example, be expressed upon plastic deformation (e.g., breakage) of one or more cell walls.

As explained, an impact force may be dissipated by a bumper via one or more mechanisms. For example, consider a breakable bumper that can dissipate force by at least a part of the breakable bumper breaking away (e.g., as a piece, as a fluid, as a gel, as one or more particles, etc.).

Figure 4:
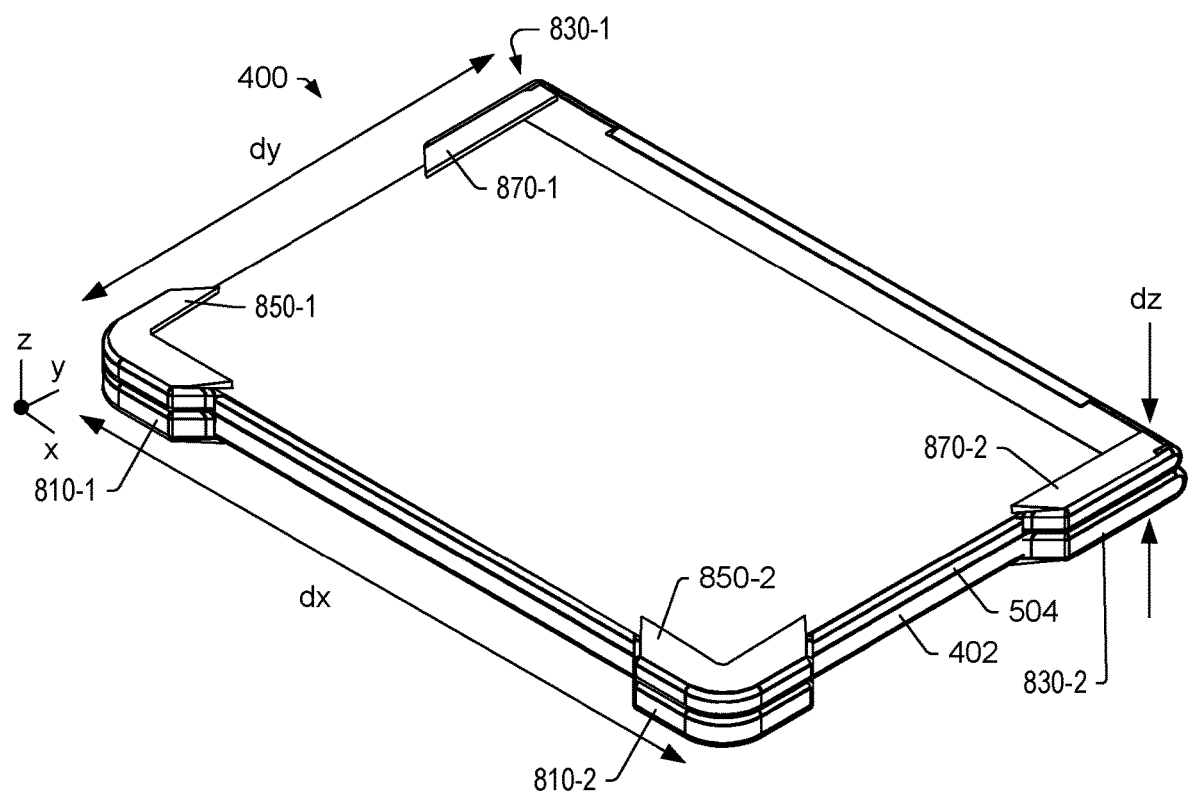
FIG. 4 is a diagram of an example of a computing device.

FIG. 4 shows an example of a computing device 400 that includes a first housing 402 and a second housing 504 in a clamshell arrangement where the housings 402 and 504 are in a closed position. The computing device 400 and the housings 402 and 504 can be defined using one or more coordinate systems such as a Cartesian coordinate system (x, y and z). For example, the computing device 400 can be defined by a width dx, a depth dy and a thickness dz where the thickness can be a sum of a thickness of a thickness of the housing 402 and a thickness of the housing 504, which may be the same or which may differ. For example, the housing 504 may be thinner than the housing 402.

As shown in FIG. 4, base housing bumpers 810-1, 810-2, 830-1 and 830-2 are mounted to the housing 402 and display housing bumpers 850-1, 850-2, 870-1 and 870-2 are mounted to the housing 504. As shown, the bumpers may include left and right pairs, which may differ for the two housings 402 and 504 and which may differ depending on whether they are front edge or back edge bumpers. In the example of FIG. 4, the bumpers 810-1, 810-2, 830-1, 830-2, 850-1, 850-2, 870-1 and 870-2 may be referred to as corner bumpers as they are each positioned at a corner of the housing 402 or the housing 504. As shown, the housings 402 and 504 can each have opposing edges and front and back edges (e.g., a free edge in the front and a hinged edge in the back) where the edges form corners. A corner may be square (e.g., two edges that form a point) or may be rounded (e.g., two edges that meet at a curve that may span 90 degrees).

In the example of FIG. 4, each of the bumpers 810-1, 810-2, 830-1, 830-2, 850-1, 850-2, 870-1 and 870-2 may include a portion that extends over an exterior surface of a respective one of the housings 402 and 504. For example, as shown, the bumpers 850-1, 850-2, 870-1 and 870-2 can extend in part over an outwardly facing substantially planar surface of the housing 504. Similarly, the bumpers 810-1, 810-2, 830-1 and 830-2 can extend in part over an outwardly facing substantially planar surface of the housing 402. Such an approach may provide for clamping bumpers to a housing.

Figure 5:
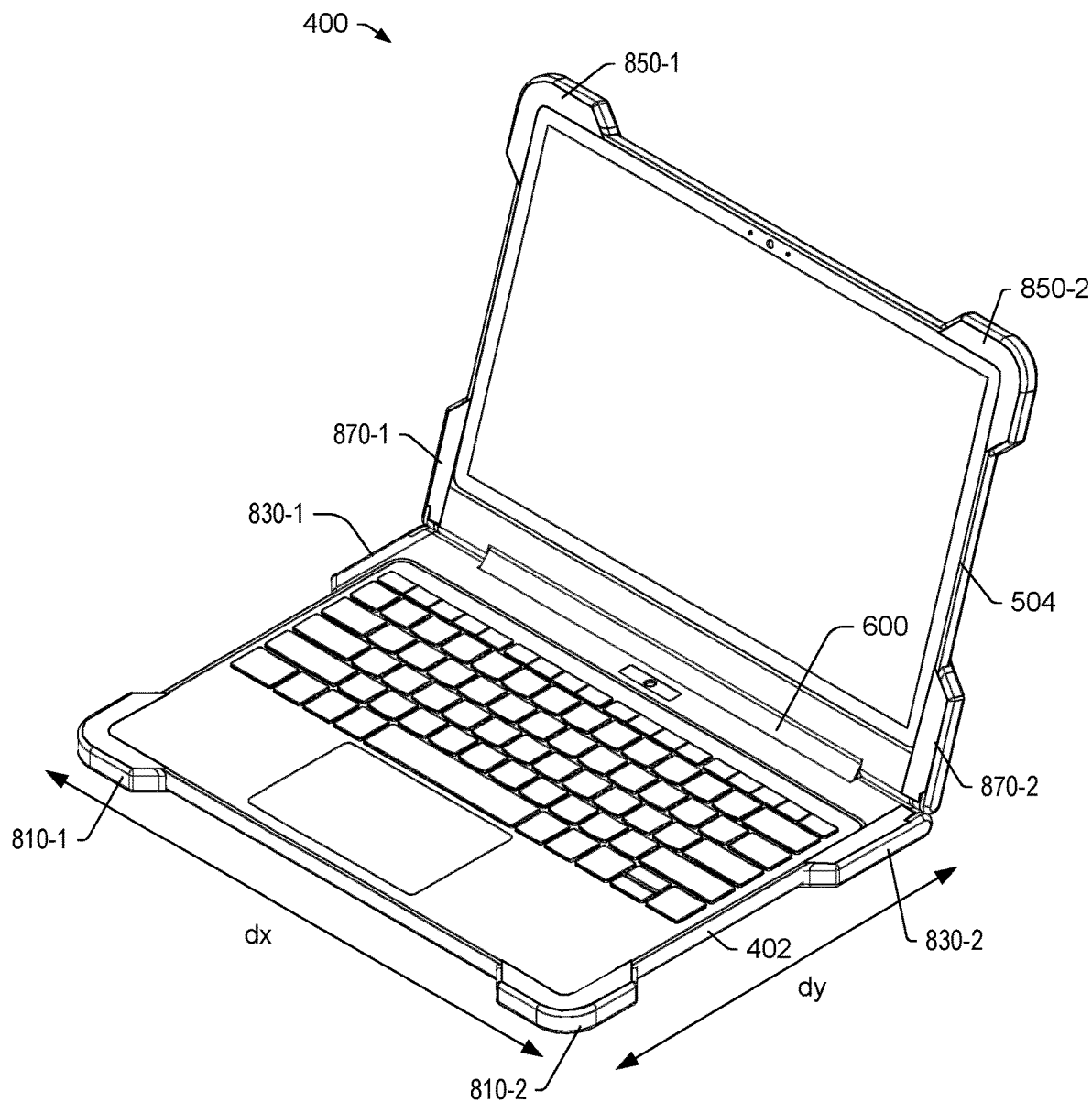
FIG. 5 is a diagram of an example of the computing device of FIG. 4.

FIG. 5 shows the computing device 400 of FIG. 4 in an open position where the housing 504 is rotated open to an open angle with respect to the housing 402 where the housings 402 and 504 are coupled via a hinge assembly 600. In FIG. 5, the bumpers 810-1, 810-2, 830-1, 830-2, 850-1, 850-2, 870-1 and 870-2 are shown where each of the bumpers may include a portion that extends in part over an inwardly facing substantially planar surface of the housing 402 or the housing 504. Such an approach may provide for clamping bumpers to a housing. For example, a housing may be an OEM housing without any specialized features for bumpers where bumpers can be clamped to such a housing. As an example, a housing may include one or more specialized features for bumpers such that one or more other types of mounting mechanisms may be utilized.

Referring again to the example of FIG. 4, where bumper portions do extend over an inwardly facing substantially planar surface of a housing or housings, they may define a gap between two housings. For example, the housings 402 and 504 in the example of FIG. 4 may not touch due to a gap defined by the bumpers 810-1, 810-2, 830-1, 830-2, 850-1, 850-2, 870-1 and 870-2. Such a gap may be minimal (e.g., less than 5 mm) such that the computing device 400 can be in a closed position where the housing 402 and 504 are substantially parallel to one another. As an example, such an approach may provide protection for one or more housings. For example, if the computing device 400 is dropped from a height, the portions of the bumpers 810-1, 810-2, 830-1, 830-2, 850-1, 850-2, 870-1 and 870-2 that define the gap may help to prevent detrimental contact between the housings 402 and 504 (e.g., keyboard to display, etc.). As an example, where the bumpers 810-1, 810-2, 830-1, 830-2, 850-1, 850-2, 870-1 and 870-2 include one or more breakaway bumpers, an outer portion may breakaway while an inner portion (e.g., disposed between the housings 402 and 504) may remain such that the housings 402 and 504 are protected to some extent from contacting each other.

Figure 6:
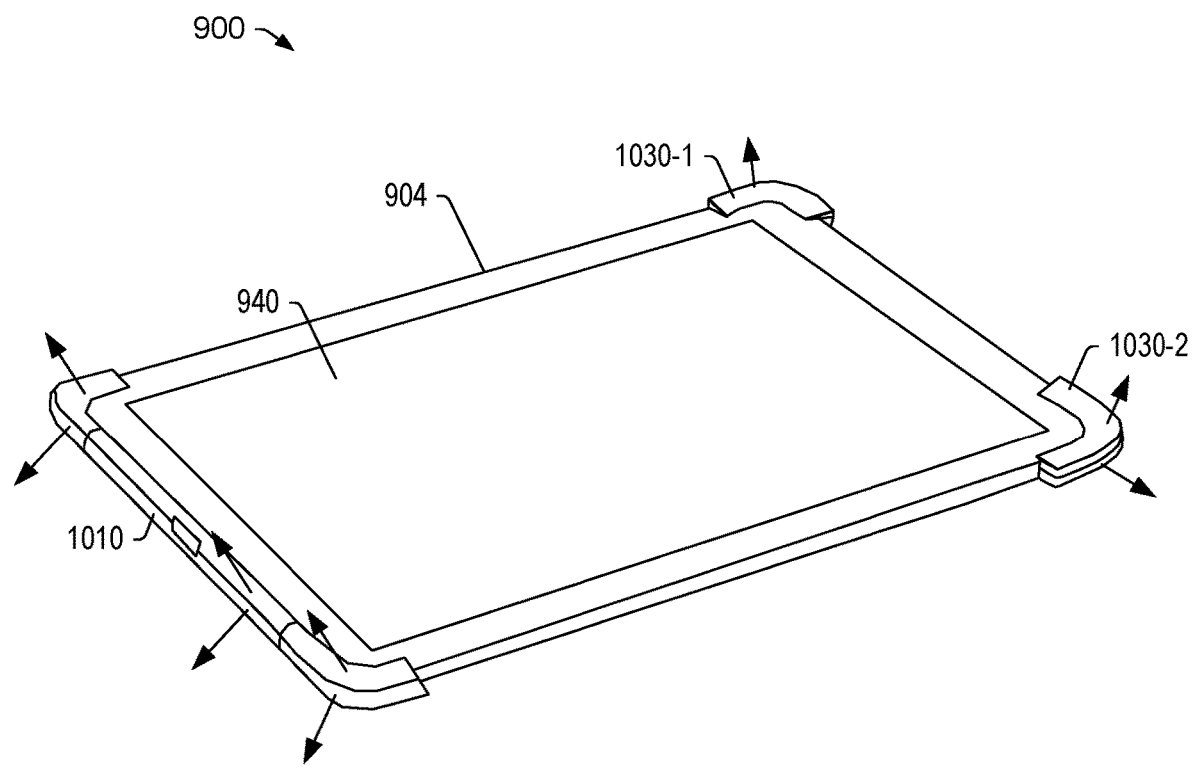
FIG. 6 is a diagram of an example of a computing device.

FIG. 6 shows an example of a computing device 900 that has a single housing 904 (e.g., a tablet device) where bumpers 1010, 1030-1 and 1030-2 are mounted to the single housing 904, which can include display 940 (e.g., along with a process and memory). In the example of FIG. 6, the bumper 1010 can extend along a bottom edge to cover two bottom corners, while, for example, the bumpers 1030-1 and 1030-2 can be for individual corners (e.g., individual top corners); noting that a bumper may be mounted adjacent to a corner or two corners, cover a single corner, two top corners, two side corners, three corners, four corners, etc.

In the example of FIG. 6, arrows indicate possible directions in which bumper pieces may fly in a breakaway manner responsive to an impact force. As explained, a dissipation mechanism may be based in part on momentum where upon impact bumper pieces can carry away momentum, which may help to reduce momentum of a computing device. As explained, multiple dissipation mechanisms may be utilized where, for example, a combination of plastic deformation mechanisms can include deforming a bumper material to dissipate impact force and breaking away of one or more bumper pieces to dissipate impact force.

Figure 7:
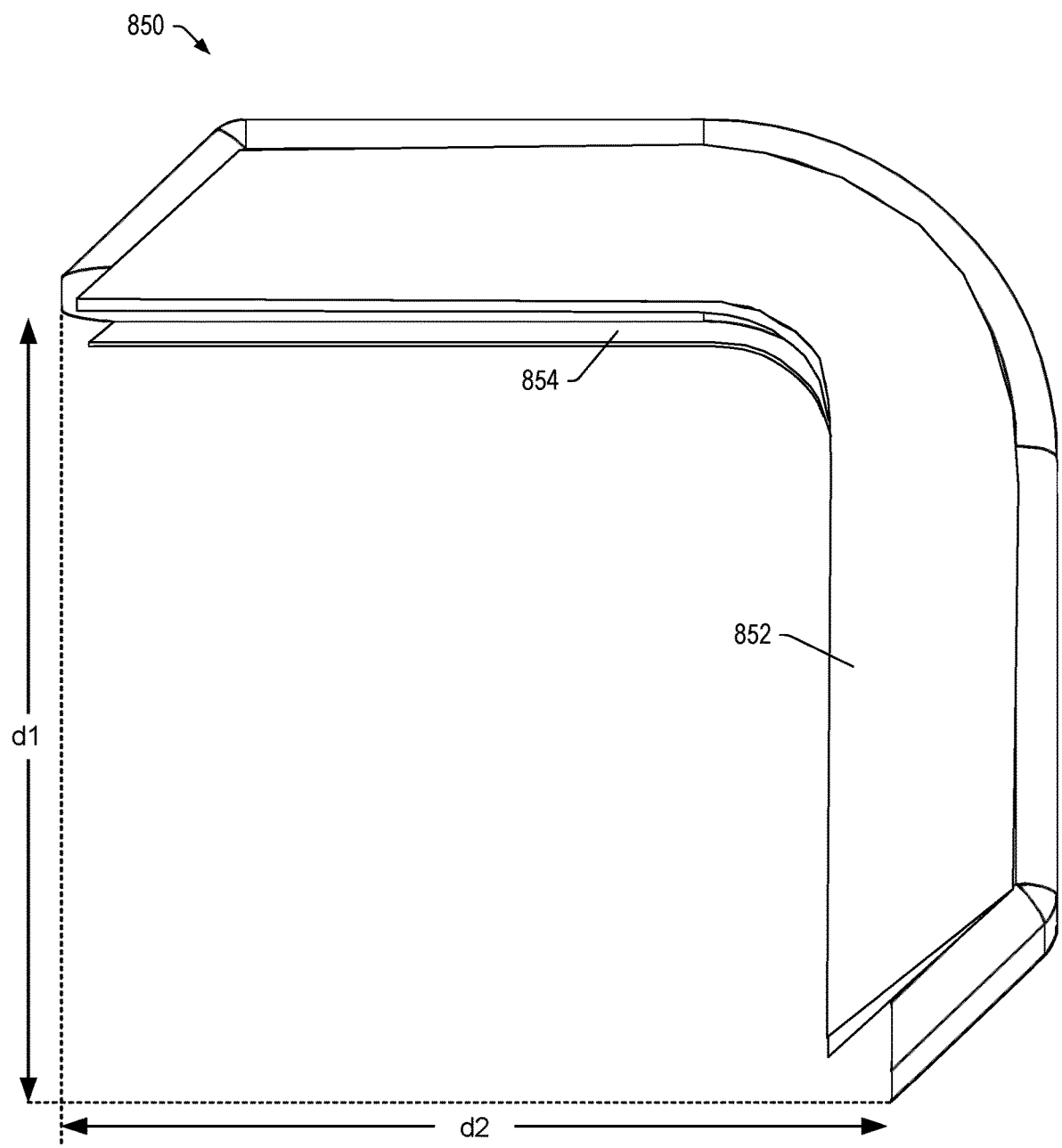
FIG. 7 is a diagram of an example of a bumper.

FIG. 7 shows an example bumper 850 such as one of the bumpers 850-1 and 810-2 of the example of FIG. 4. As shown, the bumper 850 can include a portion 852 that can extend over a surface of a housing and a portion 854 that can extend over another surface of a housing. The bumper 850 may be defined via various dimensions, which can include, for example, length dimensions d1 and d2. The bumper 850 can include a 90-degree bend where one portion to one side of the bend extends along one edge and another portion to another side of the bend extends along another edge.

Figure 8:
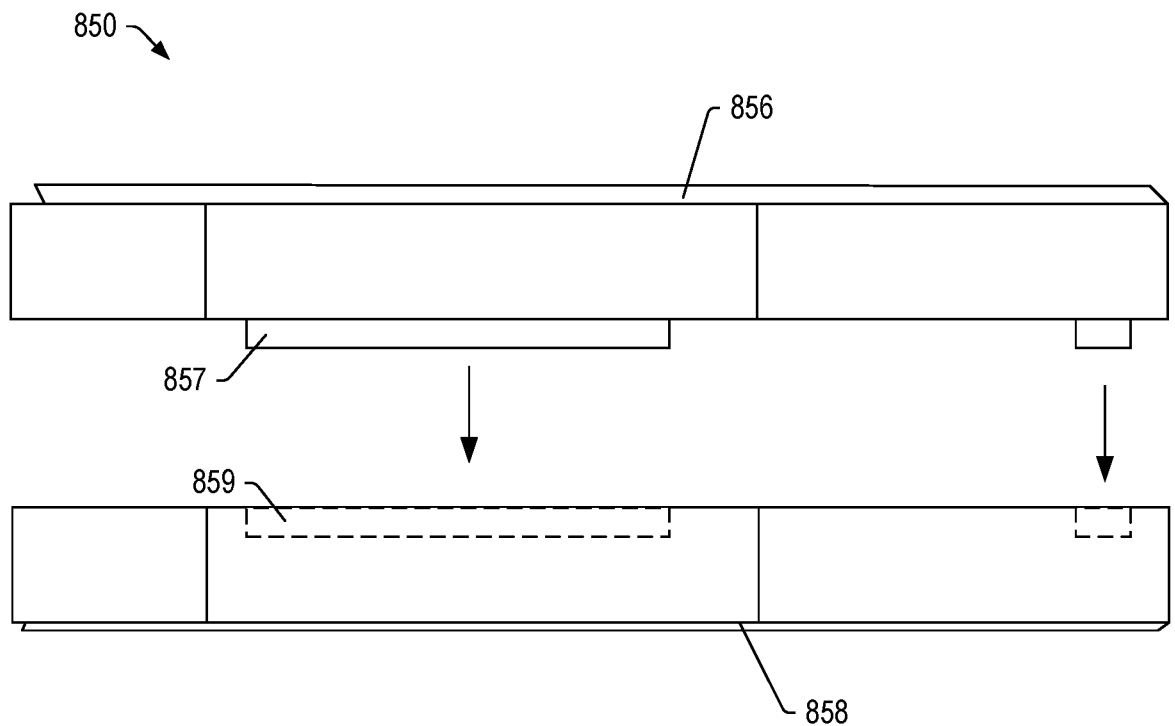
FIG. 8 is a diagram of an example of a bumper.

FIG. 8 shows the bumper 850 as being a multi-piece bumper with an upper piece 856 and a lower piece 858. In such an example, the pieces 856 and 858 may be coupled via an interference fit (e.g., a press fit) and/or a magnetic fit. For example, the bumper 850 can include an extension 857 and a recess 859 where the recess 859 can receive the extension 857 to form an interference fit and/or, for example, the extension 857 and the recess 859 may be magnetic features to form a magnetic fit (e.g., using one or more magnets). In such an example, the bumper 850 may be clamped onto a housing, for example, at a corner of the housing.

As an example, an interference fit can be tailored via one or more extensions and one or more recesses and/or material(s) thereof, to have an interference holding force that can be overcome by an impact force such that the interference fit is released and/or a magnetic fit can be tailored via one or more magnetic materials (e.g., magnets and/or ferromagnetic material) to have a magnetic holding force that can be overcome by an impact force such that the magnetic fit is released. In such examples, one or more bumper pieces may breakaway and thereby help to protect a computing device from the impact force.

Figure 9:
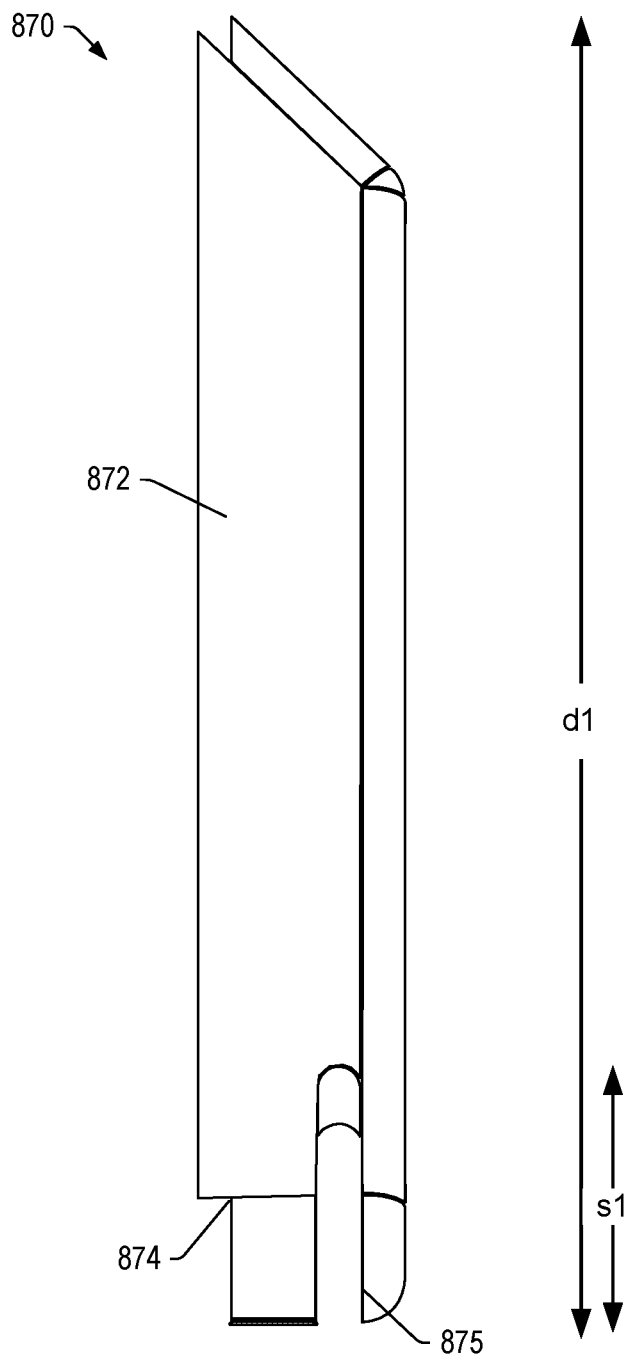
FIG. 9 is a diagram of an example of a bumper.

FIG. 9 shows an example bumper 870 such as one of the bumpers 870-1 and 870-2 of the example of FIG. 4. As shown, the bumper 870 can include a portion 872 that can extend over a surface of a housing and a portion 874 that can extend over another surface of a housing. In the example of FIG. 9, the bumper 870 includes a slot 875, which may provide for dissipation of energy, optionally by breaking such that a portion of the bumper 870 plastically deforms and breaks away. As an example, the slot 875 may provide a spring-like mechanism where some impact force can be absorbed where, upon a force greater than a yield strength, a wall or walls of the slot 875 may fracture, which can further dissipate some of the impact force. As shown in FIG. 9, the bumper 870 may be defined by one or more dimensions such as, for example, a length d1 and a slot length s1.

Figure 10:
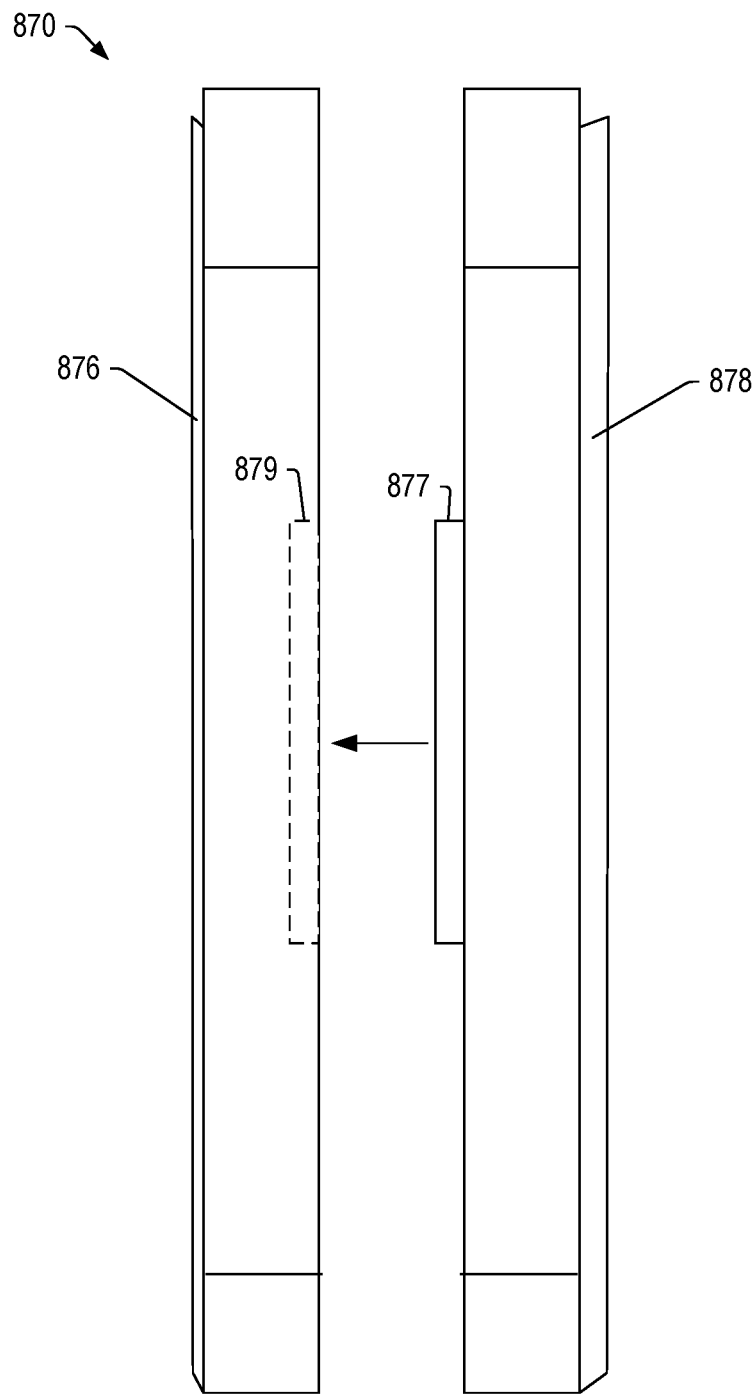
FIG. 10 is a diagram of an example of a bumper.

FIG. 10 shows the bumper 870 as being a multi-piece bumper with an upper piece 876 and a lower piece 878. In such an example, the pieces 876 and 878 may be coupled via an interference fit (e.g., a press fit) and/or via a magnetic fit. For example, the bumper 870 can include an extension 877 and a recess 879 where the recess 879 can receive the extension 877 to form an interference fit and/or, for example, the extension 877 and the recess 879 may be magnetic features to form a magnetic fit. In such an example, the bumper 870 may be clamped onto a housing, for example, at a corner of the housing.

Figure 11:
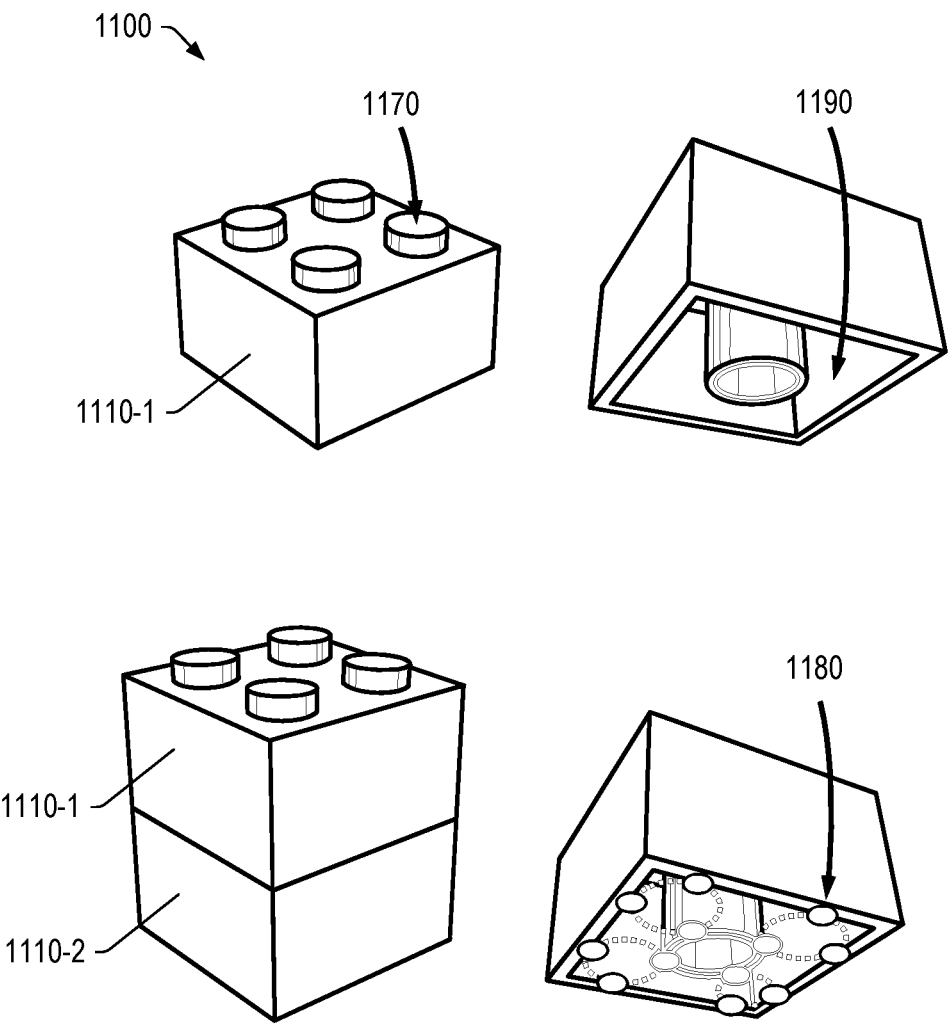
FIG. 11 is a series of diagrams of examples of interlocking features.

FIG. 11 shows an example of a brick system 1100 where one or more bricks 1110-1 and 1110-2 can include one or more extensions 1170 and/or one or more recesses 1190. In such an example, an interference fit can be formed where contact surfaces 1180 exist that can be utilized to define an interference fit force. As mentioned, a magnetic fit may be utilized as an alternative to an interference fit or in addition to an interference fit. For example, in FIG. 11, the one or more extensions 1170 and/or the one or more recesses 1190 may include magnetic material (e.g., magnets and/or ferromagnetic material).

As an example, a bumper may be a multi-piece bumper that includes one or more extensions and one or more recesses such that multiple pieces can be assembled via one or more interference fits with associated fit (e.g., holding) force(s).

Figure 12:
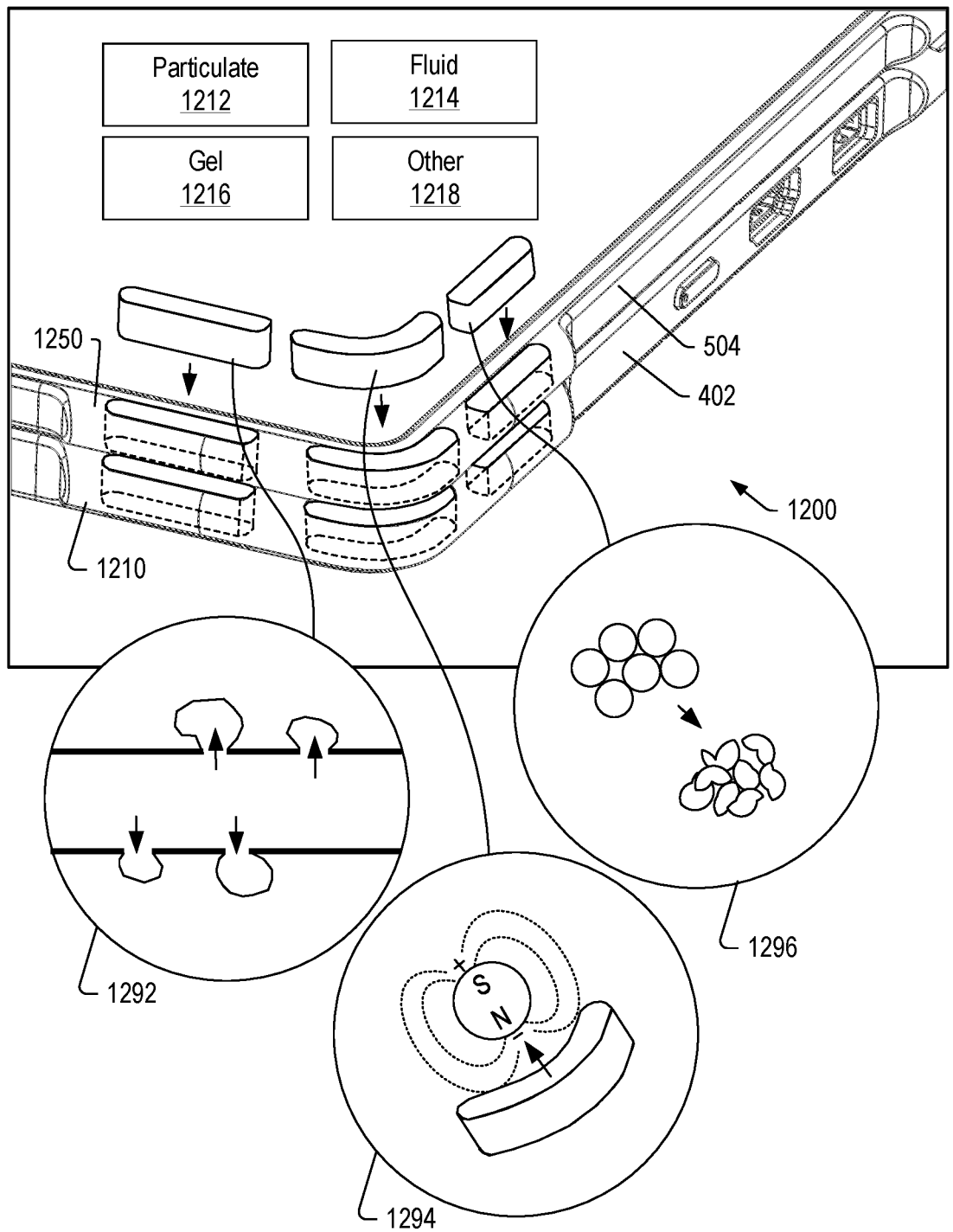
FIG. 12 is a series of diagrams of an example of a computing device and examples of bumper features.

FIG. 12 shows an example of a computing device 1200 with housings 402 and 504 along with bumpers 1210 and 1250 where each of the bumpers 1210 and 1250 can include one or more cavities. As an example, each of the cavities may be filled with a material such as, for example, one or more of particulate material 1212, fluid material 1214, gel material 1216 and one or more other materials 1218 (e.g., electrorheological fluid, magnetorheological fluid, etc.).

As an example, material may be provided in the form of a capsule that can be inserted into a cavity of a bumper body. In such an example, the capsule can include a shell that can break responsive to an impact force upon a bumper. In such an example, a bumper may include a puncture feature that can puncture a shell of a capsule such that the material in the capsule is expressed. In such an example, a bumper body may be elastically deformable and renewable upon insertion of one or more replacement capsules. For example, upon breakage of one or more capsules, any remaining portion of a capsule may be removed and replaced with a corresponding replacement capsule. As an example, a bumper body may be plastically deformable such that it deforms responsive to an impact force in a manner by which it can cause a cavity to leak (e.g., rupture) such that material can be expressed from the cavity to help dissipate the impact force.

In FIG. 12, a first inset view 1292 shows a fluid or gel expression example whereby fluid or gel (e.g., expressible material) can be expressed from a capsule, a second inset view 1294 shows how a fluid (e.g., electrorheological (ER) and/or magnetorheological MR) can be moved with respect to a field (e.g., electric, magnetic or electromagnetic) to thereby alter the rheological properties of the fluid, and a third inset view 1296 shows particle breakage where particles of a capsule can fracture and become smaller. In such an example, the fracturing of the particles can help to dissipate energy and, for example, provide for a slowdown distance, which can also help to reduce force experienced by a computing device by an impact. For example, upon breakage, the average particle size of the particles decreases such that packing efficiency can increase whereby the particles can now occupy a smaller space. In such an example, a shell of a capsule may retain its integrity to contain the particles having the smaller average particle size or the shell of the capsule may break to express the particles having the smaller average particle size.

As mentioned, a fluid can be an electrorheological (ER) fluid that is a suspension of relatively fine, non-conducting, electrically active particles (e.g., up to 50 microns in diameter) in an electrically insulating fluid. Apparent viscosity of such a fluid can change reversibly (e.g., by an order of up to 100,000) in response to an electric field. For example, an ER fluid may transition from the consistency of a liquid to that of a gel, and back, with response times on the order of milliseconds. As an example, a bumper can include one or more circuits that can generate an electrical field responsive to an impact where the electrical field can act upon one or more ER fluids that may be disposed in one or more cavities of the bumper.

As an example, a computing device and/or a bumper may include one or more circuits that can, for example, responsive to detection of a fall, actuate one or more of the one or more circuits to generate one or more electric fields that can act upon ER fluid, which may be disposed in one or more bumpers. In such an approach, the computing device and/or the bumper may utilize one or more types of sensors to determine a state of the computing device and/or the bumper. For example, consider use of one or more accelerometers that can detect acceleration of the computing device, which may be indicative of a fall (e.g., possibly a free fall). In response, the computing device and/or the bumper can trigger electric field generation circuitry that can act upon one or more ER fluids to thereby change their rheologic properties to provide for enhanced impact protection. In such an example, the computing device and/or the bumper may determine a direction of a fall, a portion of the computing device that is likely to first strike the ground (e.g., a floor, a street, etc.). In such an example, the computing device and/or the bumper (or one or more other bumpers) may selectively actuate electric field generation circuitry in a manner that can account for one or more of direction of fall, energy of fall, etc. As explained, a fluid may be expressible where expressibility can depend on rheology where, for example, rheology may be controlled via one or more electric fields (e.g., being switched on, switched off, controlled as to field strength, etc.).

As an example, a computing device and/or one or more bumpers may provide for transitioning rheologic properties of one or more ER fluids to protect the computing device from impact. For example, consider transitioning from a liquid state to a gel state and/or vice versa.

As mentioned, a fluid may be a magnetorheological fluid (MR fluid or MRF), which is a type of smart fluid in a carrier fluid, usually a type of oil. When subjected to a magnetic field, an MR fluid can increase its apparent viscosity, to the point of becoming a viscoelastic solid. The yield stress of an MR fluid when in its active ("on") state can be controlled accurately by varying magnetic field intensity. As an example, a computing device and/or one or more bumpers can provide for adjusting an MR fluid's ability to transmit force through use of one or more magnets (e.g., one or more electromagnets, permanent magnets, etc.). As an example, a magnet may be part of a bumper that moves responsive to impact to thereby change a magnetic field intensity experienced by a MR fluid to thereby alter its rheology, which can then provide for enhanced impact protection. As an example, a magnet may be part of a breakaway portion of a bumper such that upon breaking away, the rheology of a MR fluid is altered.

As mentioned, a bumper may include one or more circuits. For example, consider using one or more of the circuits described in Wang et al. (Using LEGO Bricks to Conduct Engineering Experiments, Session 2756, Proceedings of the 2004 American Society for Engineering Education Annual Conference and Exposition), which is incorporated by reference herein. Wang et al. describes motors, sound elements, lamp elements, touch sensors, light sensors, rotation sensors, temperature sensors, cameras, etc., as some examples of input and output devices. As explained, an accelerometer and/or one or more other types of circuits may provide for sensing information relevant to a fall, impact, etc., which may provide for triggering one or more countermeasures (e.g., one or more bumper-based counter-measures).

Figure 13:
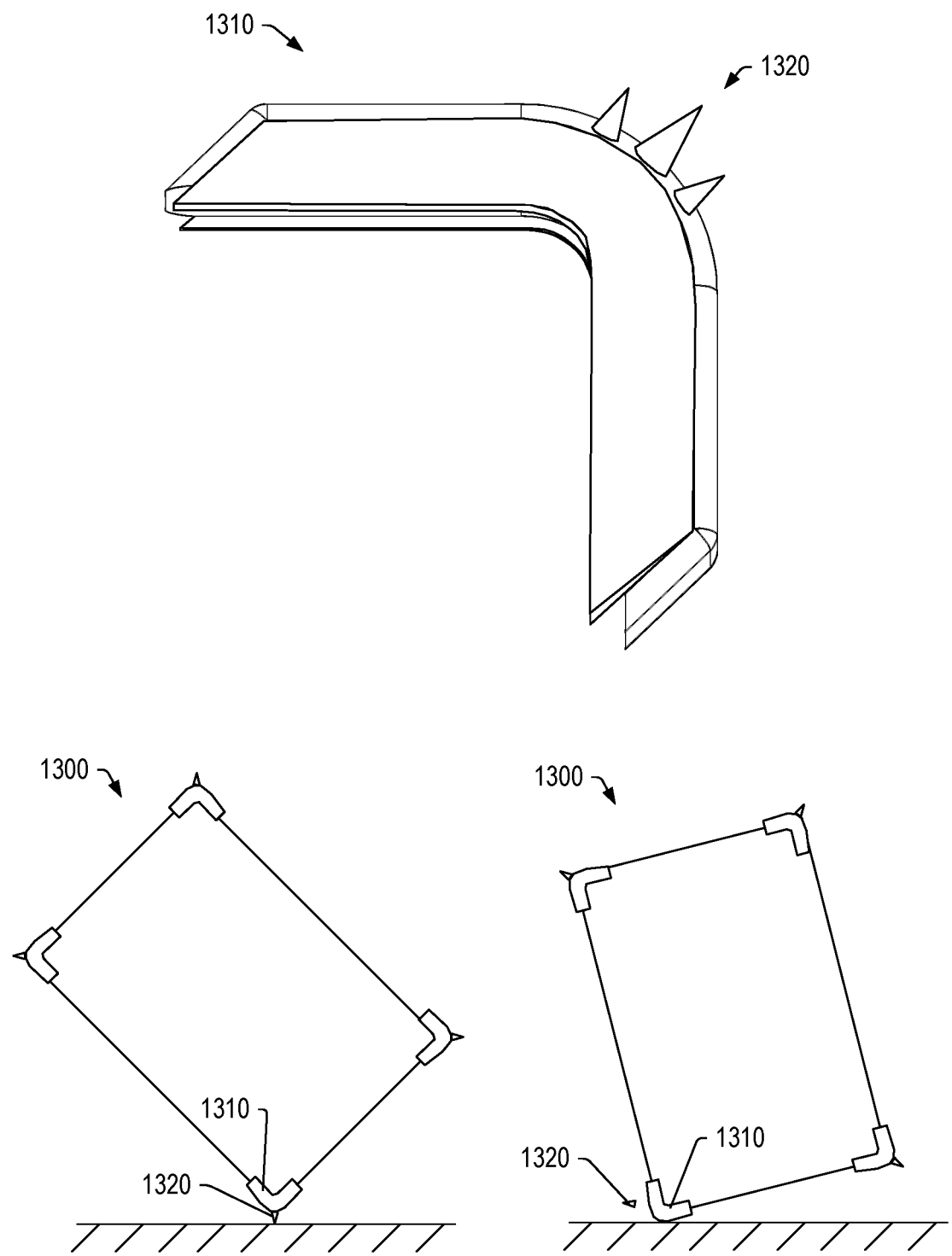
FIG. 13 is a series of diagrams of an example of a computing device and examples of bumper features.

FIG. 13 shows an example of a computing device 1300 with one or more bumpers 1310 where each of which can include one or more breakaway features 1320. For example, consider one or more of conical features (e.g., spikes, etc.), fin-like features (e.g., ridges, etc.), etc. As shown, the computing device 1300 may fall from a height onto a hard surface where a corner of the computing device 1300 may be more prone to damage due to concentration of force (e.g., consider a small surface area of the computing device 1300 impacting the hard surface). With the presence of the one or more breakaway features 1320, the orientation of the computing device 1300 may be altered along with an increase in slow-down distance. For example, a conical spike can impact the hard surface and break due to force exceeding the yield strength of the conical spike where the conical spike can break in a manner that causes the computing device 1300 to gain a moment that can result in rotation such that a larger surface area of the computing device 1300 contacts the hard surface. Hence, a breakaway feature can provide multiple types of protection (e.g., increase in slow-down distance, dissipation through plastic deformation, and rotation to an orientation with respect to a flat hard surface where more surface area can be available for impact).

As an example, the bumper 1310 of FIG. 13 may include one or more other features such as, for example, interference fit and/or magnetic fit pieces, one or more capsules, etc. As an example, a spike or other type of extension may be deployed responsive to detection of a fall. For example, consider an accelerometer detecting a fall whereby an actuator (e.g., micromotor, switch, etc.) can be actuated to cause deployment of one or more features that can provide for protection. In such an example, a breakaway feature may be deployed prior to impact (see, e.g., the one or more breakaway features 1320 of FIG. 13).

As an example, a breakable bumper can provide a slowdown distance between an impacted object and a computing device. For example, a breakable bumper may deform over a slowdown distance that can help to protect a computing device. In such an example, the slowdown distance can be a distance during which one or more interference fits separate. In such an example, frictional force of an interference fit can dissipate impact energy while the interference fit is being undone. While so-called controlled slip devices can be utilized to absorb energy where, for example, a first pipe is interference fit into a bore of a second pipe and where impact may cause the first pipe to controllably "slip" further into the bore of the second pipe, the first pipe and the second pipe remain connected. In contrast, a breakable bumper can be configured such that an impact force causes failure of an interference fit such that the breakable bumper separates into two or more pieces. While the undoing of the interference fit can help to dissipate energy, so too can the separation of the breakable bumper into two or more pieces (e.g., to cause a reduction in momentum experienced by a computing device).

As an example, an interference fit force may be determined as the product of a contact surface interference pressure, a contact surface area of an interface, and a coefficient of friction at the interface. As explained, for bricks, an interference fit (e.g., press fit) force may be approximately 5 N. Where bumpers are to be assembled and disassembled by a user, the interference fit force may be in a range of approximately 2 N to approximately 20 N or more but generally less than 100 N.

While various types of interference fits are mentioned such as press fits, a bumper may include interlocking pieces that are fit and held together via one or more magnets. As an example, a computing device may include ferromagnetic material at or near a corner whereby magnetic bumper pieces can be coupled to the computing device and/or a bumper may include ferromagnetic material whereby a magnet or magnets of a computing device may provide for mounting the bumper to the computing device. As an example, a bumper may be made of interlocking pieces that are held together using magnetic force whereby, upon impact, one or more pieces of the bumper can break away. Where bumpers are to be assembled and disassembled by a user, a magnetic force may be in a range of approximately 2 N to approximately 20 N or more but generally less than 100 N.

As an example, a bumper can be made of a material such as a polymeric material, a ceramic material, a metallic material, a composite material, etc. For example, consider one or more of acrylonitrile butadiene styrene (ABS), high-density polyethylene (HDPE), polyether ether ketone (PEEK), polyamide (e.g., NYLON), polycarbonate, polyetherimide, polybutylene terephthalate, polymethyl methacrylate (PMMA), polyoxymethylene, polypropylene, silicone, etc. As to some examples of yield strength (or yield stress), consider ABS as having a value in a range between approximately 29 MPa and 48 MPa, HDPE as having a value in a range between approximately 26 MPa and 33 MPa and polypropylene as having a value in a range between approximately 12 MPa and 43 MPa. For sake of comparison, copper (Cu), which may be considered to be a softer metal, has a value of approximately 70 MPa; whereas, an aluminum alloy 2014-T6 can have a value of approximately 400 MPa. As explained, a breakable bumper may be made of one or more types of materials where sizing, shaping, etc., may provide for desired behavior. For example, in some instances, a thinner metal may provide for impact behavior akin to a thicker polymer.

As an example, a process of manufacturer for at least a portion of a breakable bumper may include heating a thermoplastic such as, for example, ABS, to approximately 232° C. (e.g., approximately 450° F.) until it reaches a dough-like consistency, followed by injection into a mold (e.g., using forces of between 25 and 150 tonnes) where the ABS may take approximately 15 seconds to cool. As to a mold, depending on the nature of a breakable bumper (e.g., or one or more pieces thereof), the mold may permit a tolerance of up to approximately twenty microns where such a tolerance can help to ensure appropriate interference fitting can be made between pieces, between one or more pieces and a housing, etc.

As to polymeric materials, some are amenable to variety of modifications that can improve impact resistance, toughness, and/or heat resistance. For example, consider ABS where the impact resistance can be amplified by increasing the proportions of polybutadiene in relation to styrene and acrylonitrile. ABS can be formulated such that impact resistance does not fall off rapidly at lower temperatures. Thus, a thermoplastic such as ABS may be suitable for appropriate temperature ranges (e.g., an expected environmental range such as from −10° C. to 45° C., etc.) and impact resistance, along with appropriate manufacturing tolerances, where, as explained, a breakable bumper of a housing can include multiple pieces that are interference fit where upon impact one or more of the pieces can break away (e.g., release interference fit) in a manner where the pieces may be reassembled for fitting to the housing. As explained, an interference fit force can be controlled via one or more mechanisms, which can include sizing, number of fits (e.g., extensions and receptacles), hardness of material, etc. As an example, an interference fit force may be tailored in relationship to mass of a housing or housings of a computing device and an expected drop height or other maximum expected impact force.

As explained, a selected material may have a particular yield stress that can comport with a reasonable impact force, which may be based on mass of a computing device and an expected drop height (e.g., as may be determined statistically based on user drop data, conditions, etc.). As an example, a drop height may be based on type of user. For example, consider grade school children as users where they may be, generally, shorter than 1.5 meters, and where a chest high dimension of a standing child may be considered a maximum drop height (e.g., consider a height of approximately 1 meter). As to mass of a computing device, consider a mass in a range from approximately 0.1 kg to approximately 4 kg (e.g., consider a mobile phone, a tablet, a laptop, etc.).

As explained, various types of computing devices (e.g., mobile phones, tablets, laptops, etc.) are at risk of damage if dropped on to a hard surface. To mitigate risk of damage, a computing device can include one or more bumpers that provide impact absorbing properties. As explained, in various examples, material (e.g., padding, etc.) can break away (e.g., fracture, split, tear, etc.) upon impact, thereby redirecting at least a portion of an impact force into the material breaking away from the device. Such an approach can help to protect corners and/or one or more critical spots.

As an example, a bumper can be a type of ablative armor that can be removed or eroded as damage occurs therefore taking the force of a destructive action with it rather than transferring that force into one or more critical components of a computing device.

As an example, a hook and loop connection mechanism (e.g., VELCRO, etc.) may be utilized where upon impact the hooks and loops can detach to allow one or more bumper pieces to break away from a computing device. For example, consider a corner pad that can tear away upon impact. In such an example, consider a corner pad that can include one or more features such as, for example, one or more of the features described with respect to FIG. 13. In such an example, a pad can include a spike that causes a computing device to rotate such that a rotating action causes separation of a bumper or a portion thereof from the computing device. For example, consider the bumper 1310 of FIG. 13 as being adhered to the computing device 1300 via one or more hook and loop connectors (e.g., VELCRO) such that a tearing action occurs that can tearaway the bumper 1310 from the computing device 1300. While a hook and loop connection mechanism is mentioned as a type of adhesion mechanism, one or more types of adhesives may be utilized, optionally including one or more types of reusable adhesives.

As another example, consider a reinforced pop socket that collapses and tears away on impact. As an example, a bumper can be a type of padding, which may be optionally positioned somewhat off center to a corner such that the bumper can be hit (impacted) and tear away before a corner of a computing device is contacted.

As an example, a bumper or bumpers can include one or more raised ridges that can break away (e.g., break off, tear away, etc.). For example, consider a mobile phone that falls flat on its face or its back, where one or more breakable ridges can break away leaving one or more flat surfaces at lower risk of damage due to impact.

As an example, a computing device can include a processor; memory accessible to the processor; a display operatively coupled to the processor; a housing that includes four corners formed by opposing side edges that extend between opposing front and back edges; and breakable bumpers, where each of the breakable bumpers is coupled to the housing at one or more of the four corners. In such an example, each of the breakable bumpers can include multiple pieces, which can include, for example, interlocking pieces. In such an example, the interlocking pieces can include at least one extension receivable in at least one socket (e.g., a recess). In such an example, the socket may be a socket of another piece (e.g., a piece socket) and/or a socket of a housing (e.g., a housing socket).

As an example, interlocking pieces can be connectable via an interference fit. For example, consider an interference fit that has an associated interference fit force. In such an example, the interference fit force (F) can be equal to the product of a contact surface interference pressure (P), a contact surface area of an interface (A), and a coefficient of friction at the interface (CF) (e.g., $F = P \times A \times CF$).

As an example, each breakable bumper can include a plastically deformable material. For example, consider a breakable bumper made at least in part of a plastically deformable material. As an example, a plastically deformable material can be characterized by a yield strength.

As an example, a breakable bumper can include at least one plastically deformable structure. In such an example, plastic deformation of a breakable bumper may be considered as making the breakable bumper broken. As an example, at least one plastically deformable structure of a breakable bumper can include one or more of a plastically deformable cavity, a plastically deformable spike, and a plastically deformable ridge. As an example, one or more protrusions of a breakable bumper of a housing can be plastically deformable, which, upon plastic deformation, can help to protect the housing.

As an example, one or more breakable bumpers can include an expressible material that is expressed responsive to a breaking force. In such an example, the expressible material can be or include a fluid (e.g., water, air, etc.). As an example, a fluid can be or can include one or more of a liquid and a gas. As an example, an expressible material can be or include a gel (e.g., agar, other natural gel material, a harmless gel, etc.). As an example, an expressible material can be or include a solid (e.g., sand, pellets, etc.).

As an example, one or more breakable bumpers can include an electro- and/or magneto-rheological fluid. For example, consider one or more fluids that can change rheological properties responsive to electrical and/or magnetic fields.

As an example, a computing device can include a housing that is a first housing and also include a second housing along with a hinge assembly that couples the first housing and the second housing for transitions between a closed position and open positions. In such an example, the second housing can include breakable bumpers where, for example, in the closed position, portions of the breakable bumpers can be disposed between the first housing and the second housing. In such an example, portions of the breakable bumpers disposed between the first housing and the second housing can form a gap between the first housing and the second housing, where, for example, the gap is less than 5 mm. In such an example, the first and second housings may be substantially parallel when the computing device is in a closed position (e.g., a closed clamshell orientation).

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 14:
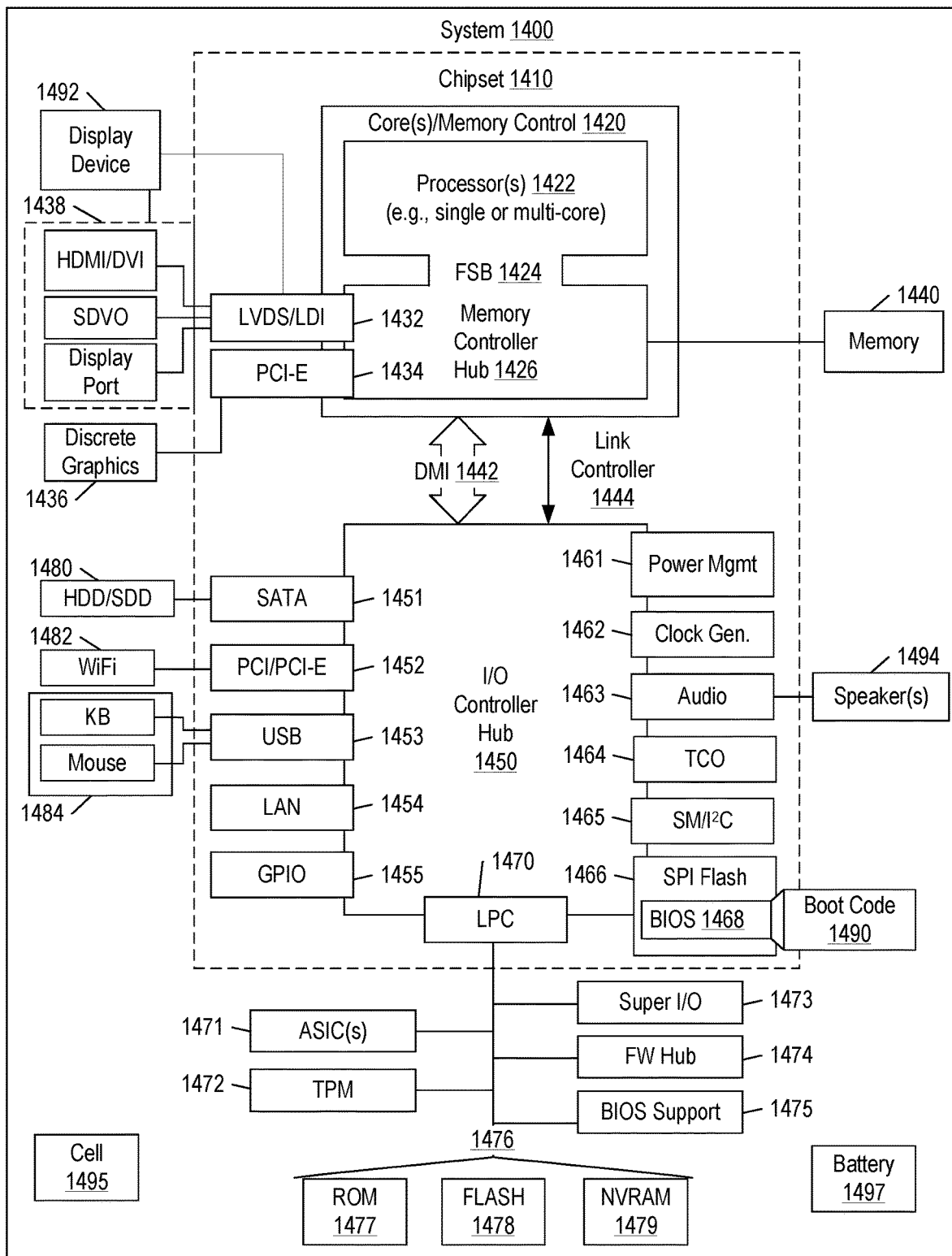
FIG. 14 is a diagram of an example of a system that includes one or more processors.

While various examples of circuits or circuitry have been discussed, FIG. 14 depicts a block diagram of an illustrative computer system 1400. The system 1400 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1400.

As shown in FIG. 14, the system 1400 includes a so-called chipset 1410. A chipset refers to a group of integrated circuits, or chips, that are designed (e.g., configured) to work together. Chipsets are usually marketed as a single product (e.g., consider chipsets marketed under the brands INTEL, AMD, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an I²C interface (see, e.g., the SM/I²C interface 1465), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
a processor;
memory accessible to the processor;
a display operatively coupled to the processor;
a housing that comprises four corners formed by opposing side edges that extend between opposing front and back edges; and
breakable bumpers, wherein each of the breakable bumpers is coupled to the housing at one or more of the four corners, and wherein each of the breakable bumpers comprises an expressible material that is expressed responsive to a breaking force.

2. The computing device of claim 1, wherein each of the breakable bumpers comprises multiple pieces.

3. The computing device of claim 2, wherein the multiple pieces comprise interlocking pieces.

4. The computing device of claim 3, wherein the interlocking pieces comprise at least one extension receivable in at least one socket.

5. The computing device of claim 2, wherein the interlocking pieces are connectable via an interference fit.

6. The computing device of claim 5, wherein the interference fit comprises an associated interference fit force.

7. The computing device of claim 6, wherein the interference fit force is equal to the product of a contact surface interference pressure, a contact surface area of an interface, and a coefficient of friction at the interface.

8. The computing device of claim 1, wherein each of the breakable bumpers comprises a plastically deformable material.

9. The computing device of claim 8, wherein the plastically deformable material comprises a yield strength.

10. The computing device of claim 1, wherein each of the breakable bumpers comprises at least one plastically deformable structure.

11. The computing device of claim 10, wherein the at least one plastically deformable structure comprises one or more of a plastically deformable cavity, a plastically deformable spike, and a plastically deformable ridge.

12. The computing device of claim 1, wherein the expressible material comprises a fluid.

13. The computing device of claim 12, wherein the fluid comprises one or more of a liquid and a gas.

14. The computing device of claim 1, wherein the expressible material comprises a gel.

15. The computing device of claim 1, wherein each of the breakable bumpers comprises an electro- and/or magneto-rheological fluid.

16. The computing device of claim 1, wherein the housing is a first housing and comprising a second housing and a hinge assembly that couples the first housing and the second housing for transitions between a closed position and open positions.

17. The computing device of claim 16, wherein the second housing comprises breakable bumpers.

18. The computing device of claim 17, wherein, in the closed position, portions of the breakable bumpers are disposed between the first housing and the second housing.

19. The computing device of claim 18, wherein the portions of the breakable bumpers disposed between the first housing and the second housing form a gap between the first housing and the second housing, wherein the gap is less than 5 mm.

20. A computing device comprising:
a processor;
memory accessible to the processor;
a display operatively coupled to the processor;
a housing that comprises four corners formed by opposing side edges that extend between opposing front and back edges; and
breakable bumpers, wherein each of the breakable bumpers is coupled to the housing at one or more of the four corners, and wherein each of the breakable bumpers comprises an electro- and/or magneto-rheological fluid.

* * * * *